(12) United States Patent
Naka

(10) Patent No.: US 10,586,322 B2
(45) Date of Patent: Mar. 10, 2020

(54) METHOD FOR DETECTING COORDINATES, COORDINATE OUTPUT DEVICE AND DEFECT INSPECTION DEVICE

(71) Applicant: Toshiba Memory Corporation, Tokyo (JP)

(72) Inventor: Masato Naka, Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 93 days.

(21) Appl. No.: 15/696,454

(22) Filed: Sep. 6, 2017

(65) Prior Publication Data

US 2018/0276806 A1    Sep. 27, 2018

(30) Foreign Application Priority Data

Mar. 22, 2017   (JP) .................................. 2017-056407

(51) Int. Cl.
  *G06T 7/00*     (2017.01)
  *G06T 7/73*     (2017.01)
(52) U.S. Cl.
  CPC ............ *G06T 7/001* (2013.01); *G06T 7/0004* (2013.01); *G06T 7/73* (2017.01); *G06T 7/74* (2017.01); *G06T 2207/10056* (2013.01); *G06T 2207/30148* (2013.01)
(58) Field of Classification Search
  None
  See application file for complete search history.

(56) References Cited

U.S. PATENT DOCUMENTS

| | | | |
|---|---|---|---|
| 7,643,140 B2 | 1/2010 | Ueno et al. | |
| 9,097,686 B2 | 8/2015 | Bamba et al. | |
| 2002/0047098 A1 | 4/2002 | Tokumoto | |
| 2005/0104017 A1 | 5/2005 | Kimba et al. | |
| 2008/0058977 A1* | 3/2008 | Honda | G03F 1/86 700/110 |

(Continued)

FOREIGN PATENT DOCUMENTS

| | | |
|---|---|---|
| JP | 2000-232138 A | 8/2000 |
| JP | 2002-131253 A | 5/2002 |

(Continued)

*Primary Examiner* — Kevin Ky
(74) *Attorney, Agent, or Firm* — Finnegan, Henderson, Farabow, Garrett & Dunner, L.L.P.

(57) ABSTRACT

A method for detecting coordinates includes detecting a first position in an inspection target placed on a placement surface of an inspection stage and a second position in the inspection target separated from the first position. A coordinate shift from the first position to the second position includes a first shift component in a first direction taken along the placement surface, and a second shift component in a second direction taken along the placement surface and crossing the first direction. The method further includes calculating a coordinate in the first direction of the second position using a first function, the first function including the first shift component and the second shift component as variables; and calculating a coordinate in the second direction of the second position using a second function, the second function including the first shift component and the second shift component as variables.

11 Claims, 7 Drawing Sheets

(56) References Cited

U.S. PATENT DOCUMENTS

| | | | |
|---|---|---|---|
| 2011/0078459 A1 | 3/2011 | Yoshioka et al. | |
| 2012/0147363 A1 | 6/2012 | Suzuki et al. | |
| 2014/0169657 A1* | 6/2014 | Harada | G01N 21/956 |
| | | | 382/145 |
| 2016/0155015 A1* | 6/2016 | Bendall | G01N 21/8851 |
| | | | 382/199 |

FOREIGN PATENT DOCUMENTS

| | | |
|---|---|---|
| JP | 2002-232138 A | 8/2002 |
| JP | 2005-91342 A | 4/2005 |
| JP | 2008-41940 | 2/2008 |
| JP | 2008-268199 | 11/2008 |
| JP | 2013-15491 | 1/2013 |
| WO | WO 2011/040223 A1 | 4/2011 |

\* cited by examiner

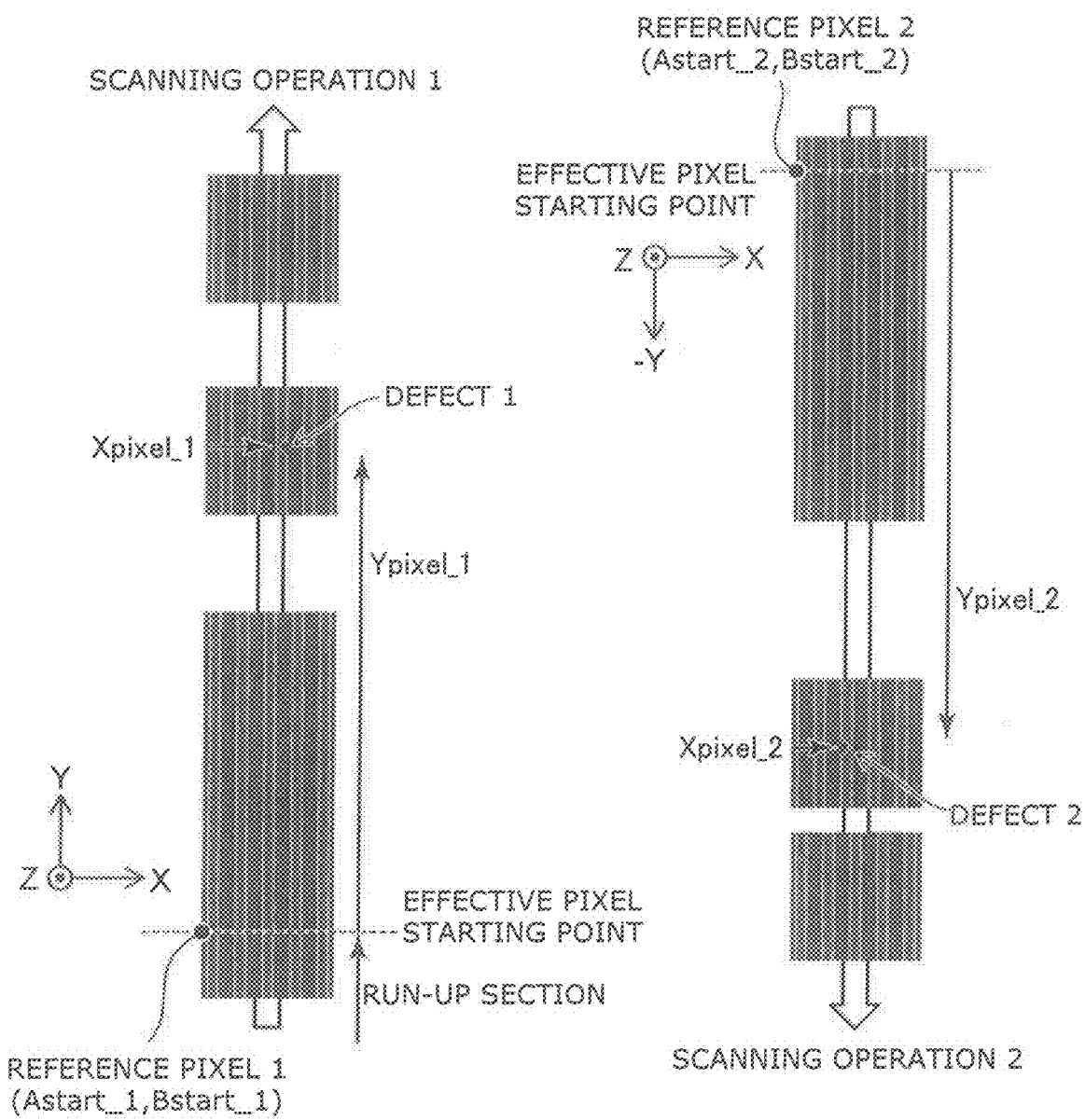

METHOD FOR DETECTING COORDINATES, COORDINATE OUTPUT DEVICE AND DEFECT INSPECTION DEVICE

CROSS-REFERENCE TO RELATED APPLICATIONS

This application is based upon and claims the benefit of priority from Japanese Patent Application No. 2017-056407, filed on Mar. 22, 2017; the entire contents of which are incorporated herein by reference.

FIELD

Embodiments generally relate to a method for detecting coordinates, a coordinate output device and a defect inspection device.

BACKGROUND

There are many devices detecting and outputting coordinates of an inspection target, such as position precision measurement devices or defect inspection devices. For example, the shrinkage level of circuit patterns in semiconductor devices is advanced to a few nanometers. In addition, an improvement of precision is also accelerated in a coordinate output devices used for the inspection.

BRIEF DESCRIPTION OF THE DRAWINGS

FIGS. 3A and 3B are schematic diagrams illustrating a coordinate detection method according to the embodiment;

FIG. 4 is a schematic diagram illustrating data obtained in accordance with the inspection method according to the embodiment;

DETAILED DESCRIPTION

Figure 1:
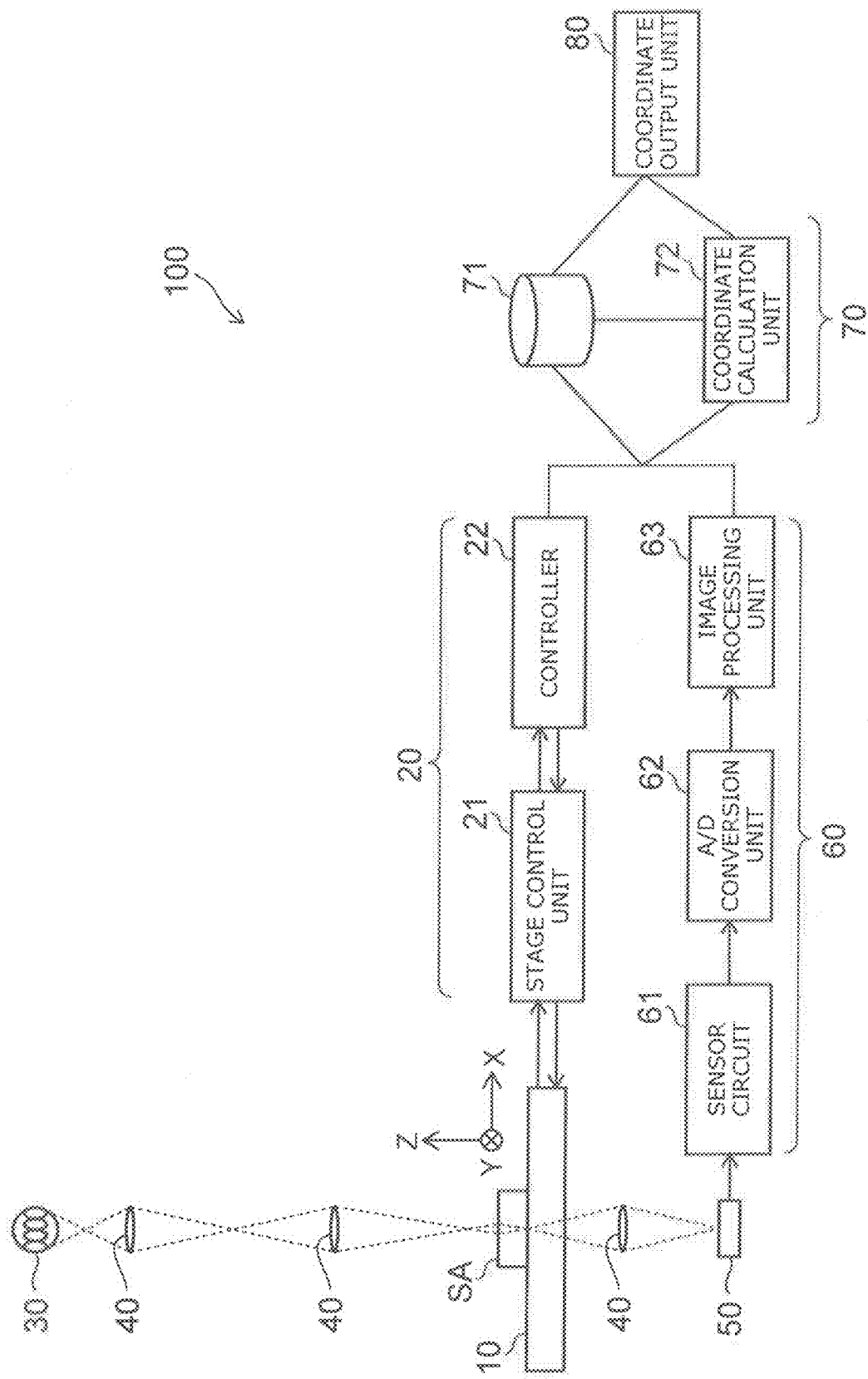
FIG. 1 is a block diagram illustrating a coordinate output device according to an embodiment.

According to one embodiment, a method for detecting coordinates includes detecting a first position in an inspection target placed on a placement surface of an inspection stage and a second position in the inspection target separated from the first position. A coordinate shift from the first position to the second position includes a first shift component in a first direction taken along the placement surface, and a second shift component in a second direction taken along the placement surface and crossing the first direction. The method further includes calculating a coordinate in the first direction of the second position using a first function, the first function including the first shift component and the second shift component as variables; and calculating a coordinate in the second direction of the second position using a second function, the second function including the first shift component and the second shift component as variables.

Embodiments will now be described with reference to the drawings. Similar portions in the drawings are marked with like numerals and a detailed description thereof is omitted as appropriate; and portions that are different are described. The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even for identical portions.

In the examples hereinbelow, the dispositions and configurations of the components are described referring to an X-axis direction, a Y-axis direction, and a Z-axis direction of an orthogonal coordinate system shown in the drawings. Also, there are cases where the Z-axis direction is described as up and the opposite direction is described as down.

FIG. 1 is a block diagram illustrating a coordinate output device 100 according to an embodiment. The coordinate output device 100 includes, for example, an inspection stage 10, a control unit 20, a light source 30, an optical system 40, a detection unit 50, a signal processing unit 60, a calculation unit 70, and a coordinate output unit 80.

The inspection stage 10 includes a driving unit (not illustrated). The inspection stage 10 is movable in the X-direction, the Y-direction, and a rotation direction centering on the Z-axis. An inspection target SA is placed on the upper surface of the inspection stage 10. The coordinate output device 100 includes the detection unit 50 below the inspection stage 10 that detects light transmitted through the inspection target SA. The inspection stage 10 has a light transmission region in a portion on which the inspection target SA is placed. The embodiment is not limited thereto. For example, a configuration for detecting reflected light or a configuration for detecting an electron ray may be used. The inspection target SA is fixed on the inspection stage using, for example, electrostatic chuck or the like. A position detection device (not illustrated) such as a laser interferometer or a linear scale is disposed on the inspection stage.

The control unit 20 includes, for example, a stage control unit 21 and a controller 22. For example, the stage control unit 21 controls a position of the inspection stage 10 based on an output of a laser interferometer. The controller 22 causes the stage control unit 21 to move the inspection stage 10 to a predetermined position and outputs the position of the inspection stage 10.

The light source 30 emits inspection light. For example, the light source 30 may be one such as a filament or LaB6 that emit electron ray. The inspection light may be an actinic ray with a wavelength of 13.5 nanometers (nm) or an infrared ray with a wavelength longer than an ultraviolet ray with a wavelength of 193 nm or 266 nm. The inspection light may be an X-ray.

The optical system 40 focuses the inspection light, and Irradiates the inspection target SA with the inspection light. The optical system 40 includes a lens that focuses the inspection light on the detection unit 50, which is transmitted through the inspection target. The optical system 40 includes, for example, an optical lens or an electrostatic lens. The optical system 40 may be configured to be controlled by the controller 22 in the control unit 20.

The detection unit 50 is, for example, a CCD sensor or a TDI sensor. The detection unit 50 may be an MCP used in a scanning electron microscope.

The signal processing unit 60 includes, for example, a sensor circuit 61, an A/D conversion unit 62, and an image processing unit 63. The sensor circuit 61 detects an output of the detection unit 50 and transfers the output to the A/D conversion unit 62. The A/D conversion unit 62 converts an analog output of the sensor circuit 61 into a digital signal and outputs the digital signal to the image processing unit 63. The image processing unit 63 converts the output of the A/D conversion unit 62 into an image and specifies a pattern or a defect of the inspection target SA. The image processing unit 63 converts the output of the A/D conversion unit 62 into an image and subsequently, for example, specifies a pattern of the inspection target SA by comparing the image with a design pattern stored in advance. A pattern defect is also detected in the inspection target SA by comparing the converted image with the design pattern. Then, the image processing unit 63 outputs stage coordinates corresponding to pixels in the image based on the position of the inspection stage 10 which is output from the controller 22.

The calculation unit 70 includes, for example, a database 71 and a coordinate calculation unit 72. The database 71 stores the image of the inspection target SA and the stage coordinates output from the image processing unit 63. The coordinate calculation unit 72 calculates coordinates corresponding to the pattern of the inspection target SA based on the image and the stage coordinates stored in the database 71. The database 71 stores the coordinates calculated by the coordinate calculation unit 72.

The coordinate output unit 80 outputs the coordinates calculated by the calculation unit 70. For example, the coordinate output unit 80 outputs a file that lists an identification data id, a coordinate x, a coordinate y and the like of a pattern or a defect in the inspection target SA, which are desired to be measured.

Figure 2:
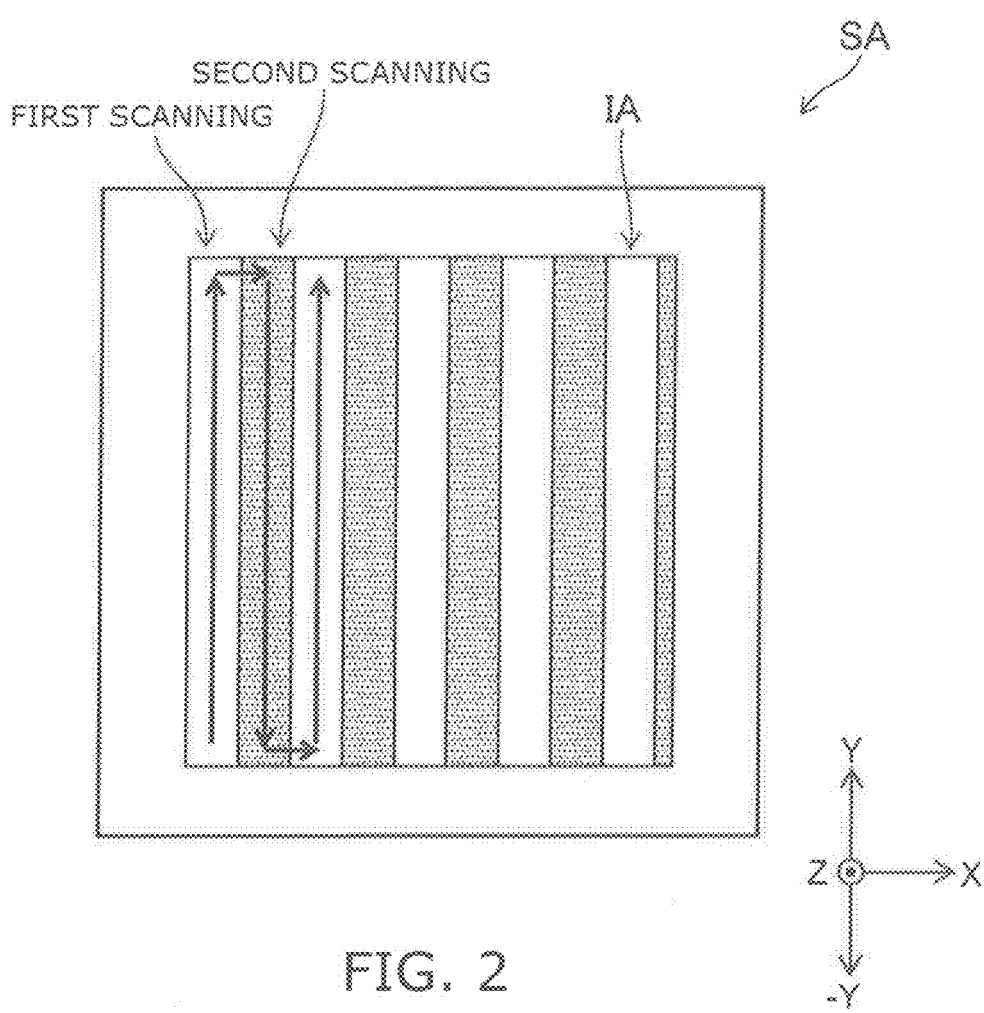
FIG. 2 is a schematic plan view illustrating an inspection method according to the embodiment.

FIG. 2 is a schematic plan view illustrating an inspection method according to the embodiment. FIG. 2 illustrates a scan scheme in a case in which an inspection region IA of the inspection target SA is imaged by the detection unit 50. In the example, the inspection region IA is scanned by moving a region imaged by the detection unit 50 in the Y-direction at a constant speed. For example, the inspection region IA is scanned in the Y-direction by moving the inspection stage 10 (a first scanning operation). Subsequently, after the inspection stage 10 is moved so that an imaging area of the detection unit 50 is shifted in the X-direction, the inspection region IA is scanned in the −Y-direction (a second scanning operation). Further, an image covering the entire inspection region IA is obtained by repeating the shifting in the X-direction and the scanning in the Y-direction and the −Y-direction.

FIGS. 3A and 3B are schematic diagrams illustrating a coordinate detection method according to the embodiment. FIG. 3A is a schematic diagram illustrating the first scanning operation. FIG. 3B is a schematic diagram illustrating the second scanning operation. FIGS. 3A and 3B illustrate examples in which defect coordinates of the inspection target SA are detected.

The coordinates of a defect 1 illustrated in FIG. 3A are detected, for example, based on an image after passing through a certain run-up section. That is, in the inspection, an image obtained while the inspection stage 10 moves with a constant speed after passing through the run-up section is regard as an effective image, and is used to detect the defect coordinates. The run-up section is a section in which the stage reaches at the constant speed. A period that is necessary for stabilizing light strength of the light source 30 may be included in the time for passing through the run-up section.

In the first scanning operation illustrated in FIG. 3A, a reference pixel 1 is set at a boundary (a starting point of effective imaging) between the run-up section and the effective image section, and the coordinates of the reference pixel 1 are assumed to be reference coordinates (Asart_1, Bstart_1). For example, the defect 1 in the image obtained through the first scanning operation is at a position shifting from the reference pixel 1 by Xpixel_1 in the X-direction and Ypixel_1 in the Y-direction.

In the second scanning operation illustrated in FIG. 3B, a reference pixel 2 is set at a boundary (an starting point of effective imaging) between a run-up section and an effective image section, and the coordinates of the reference pixel 2 are assumed to be reference coordinates (Asart_2, Bstart_2). For example, the defect 2 in the image obtained through the second scanning operation is at a position shifting from the reference pixel 2 by Xpixel_2 in the X-direction and Ypixel_2 in the Y-direction.

In the inspection method according to the embodiment, the imaging area of the detection unit 50 is scanned in the Y-direction and the −Y-direction in the inspection region IA, and continuous images are obtained in the respective scanning directions. Then, the coordinates of a target object in each image are detected based on the number of pixels corresponding to a shift amount from the reference coordinates.

FIG. 4 is a schematic diagram illustrating data obtained in accordance with the inspection method according to the embodiment. As illustrated in FIG. 4, the reference coordinates (Astart_n, Bstart_n) and the number of pixels (Xpixel_n, Ypixel_n) is detected at target coordinates. Here, n (which is a positive integer) is a symbol indicating a sequential order of the scanning operation.

For example, the controller 22 outputs an end timing of the run-up section to the image processing unit 63, and also outputs information corresponding to a position of the inspection stage thereto. The controller 22 makes the image processing unit 63 output the stage coordinates and the number of pixels (Xpixel_n, Ypixel_n) corresponding to the reference pixel to the calculation unit 70. The calculation unit 70 calculates the reference coordinates (Astart_n, Bstart_n) based on the stage coordinates corresponding to the reference pixel through the correction described below, and stores the reference coordinates (Astart_n, Bstart_n) along with the number of pixels (Xpixel_n, Ypixel_n) in the database 71.

Figure 5:
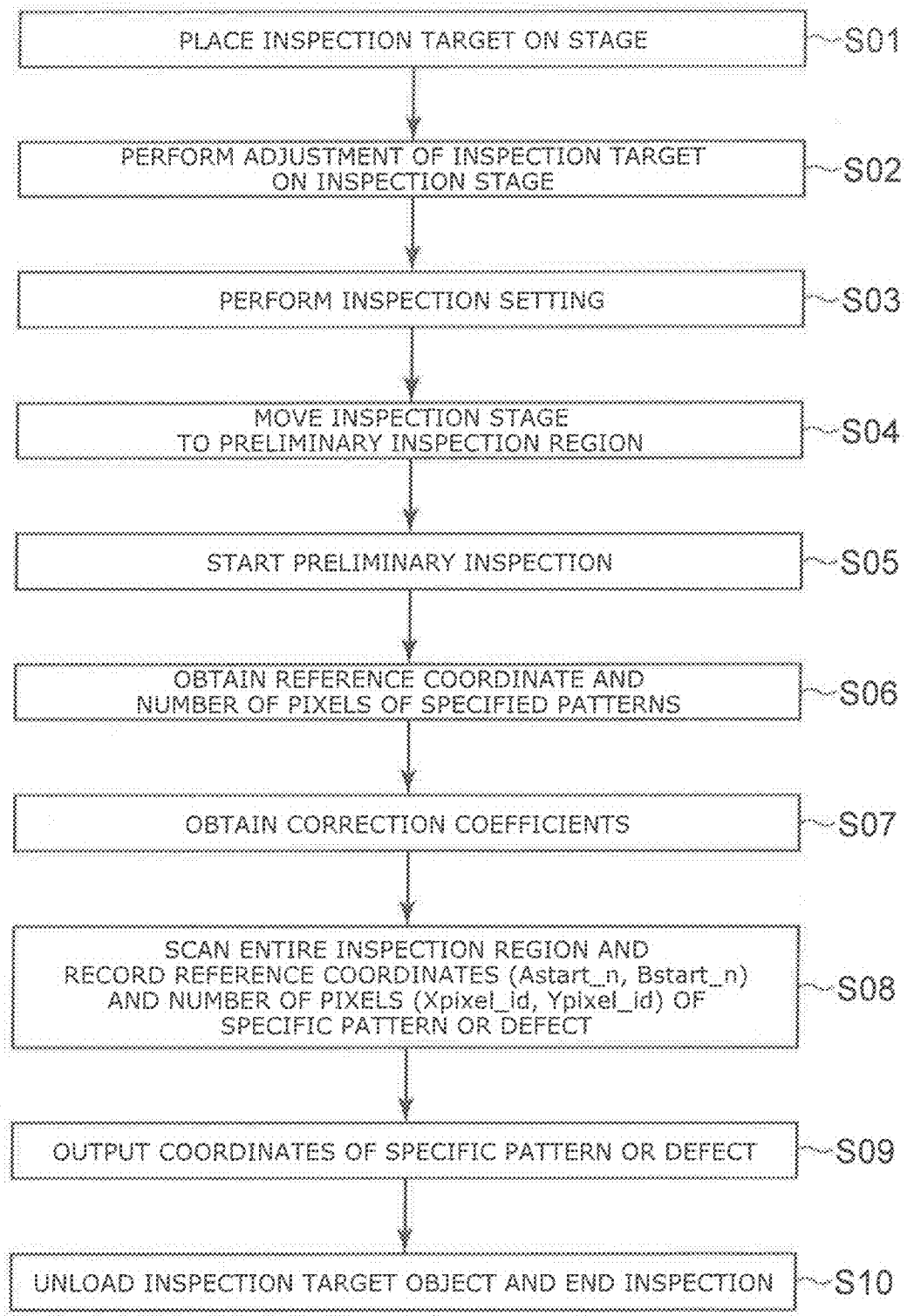
FIG. 5 is a flowchart illustrating the coordinate detection method according to the embodiment.

Next, a coordinate detection method according to the embodiment will be described with reference to FIGS. 5 and 6. FIG. 5 is a flowchart illustrating the coordinate detection method according to the embodiment. FIGS. 6A and 6B are schematic plan views illustrating the inspection target SA. Hereinafter, the description will be made in accordance with the flowchart illustrated in FIG. 5.

First, the inspection target SA is placed on the inspection stage 10 (S01). Then, a predetermined pattern of the inspection target SA is imaged, for example, and adjustments of magnification, rotation, orthogonality, offset, and the like are carried out (S02). For example, coefficients a to f of Equation (1) and Equation (2) are calculated using known coordinates of the specified pattern in the inspection target SA and the coordinates in the inspection stage 10 corresponding to the specified pattern.

$$X_{object} = a \times X_{stage} + b \times Y_{stage} + c \quad (1)$$

$$Y_{object} = d \times X_{stage} + e \times Y_{stage} + f \quad (2)$$

Here, Xobject and Yobject are known coordinates of the specified pattern in the inspection target SA, and Xstage and Ystage are the stage coordinates of the specified pattern. The stage coordinates (Xstage, Ystage) are, for example, the coordinates of the specified pattern on the inspection stage 10 based on the position of the inspection stage 10 that is output from the controller 22.

The coefficients of "a" to "f" are calculated, for example, based on the stage coordinates of three or more specified patterns in the inspection target SA. That is, the coefficients "a" to "f" can be calculated by solving a simultaneous equation of Equations (1) and (2) to which three or more pairs of the known coordinates (Xobject, Yobject) and the stage coordinates (Xstage, Ystage) are substituted using, for example, regression is analysis. The coefficients "a" and "e" indicate magnification correction in the X and Y-directions, respectively, the coefficients and "b" and "d" indicate rotation and orthogonality correction, and the coefficients "c" and "f" indicate offset correction in the X and Y-directions, respectively.

The adjustments of magnification, rotation, orthogonality, offset, and the like is not limited to ones using such a method, but may be geometrically corrected based on, for example, an image and design coordinates.

Figure 6A:
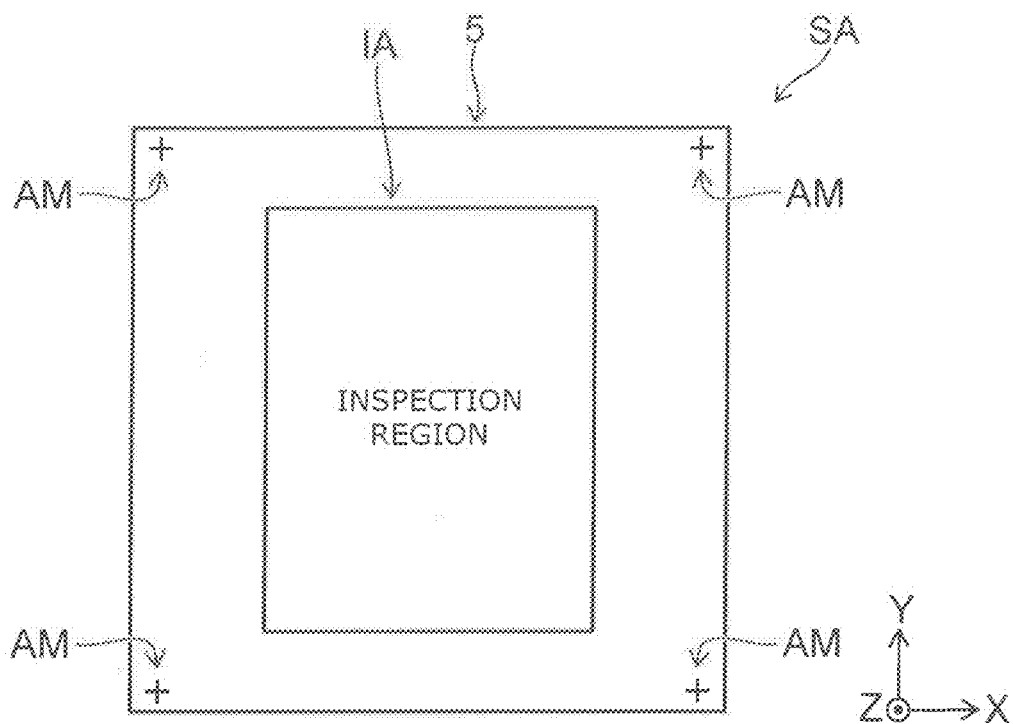
FIGS. 6A and 6B are schematic plan views illustrating the inspection target.
Figure 6B:
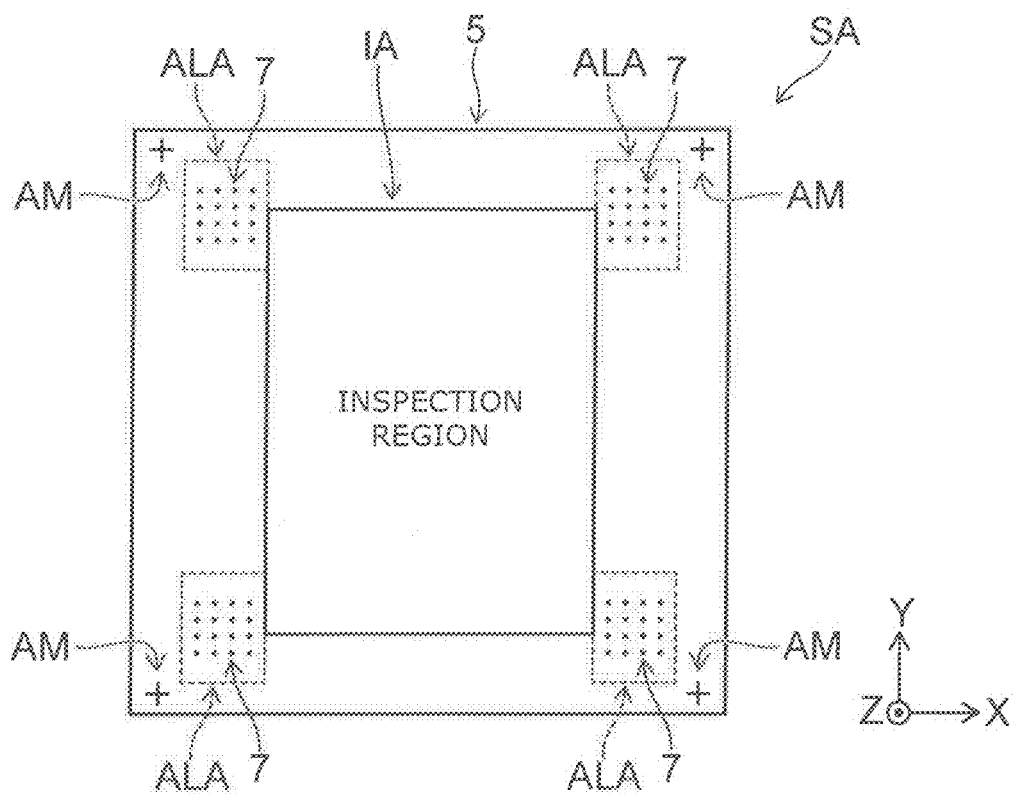

FIG. 6A is a schematic plan view illustrating the top surface of the inspection target SA. The inspection target SA is, for example, a quartz substrate 5, and has a plurality of patterns provided in the top surface. The inspection region IA and alignment marks AM are provided in the top surface of the inspection target SA. An inspection target pattern is disposed in the inspection region IA. As illustrated in FIG. 6A, the plurality of alignment marks AM are provided so as to be separated from each other. For example, the alignment marks AM are disposed at four corners of the rectangular inspection region IA. For example, before the inspection region IA is inspected, the inspection stage 10 is moved so that the alignment marks AM enter an imaging area. Subsequently, the alignment marks AM are imaged to obtain the stage coordinates (Xstage, Ystage) corresponding to the alignment marks AM in accordance with image matching or the like. Then, the coordinates (Xobject, Yobject) of the alignment marks AM which are the known coordinates on the inspection target SA and the stage coordinates (Xstage, Ystage) are substituted to Equations (1) and (2) to obtain a simultaneous equation including the coefficients "a" to "f" as variables. Subsequently, the coefficients "a" to "f" are calculated by solving the simultaneous equation. In this manner, Correction Equations (3) and (4) of the stage coordinates (Xstage, Ystage) can be obtained by obtaining the correlation between the existing coordinates of the inspection target SA and the stage coordinates of the inspection stage 10.

$$X_{correct}=a \times X_{stage}+b \times Y_{stage}+c \quad (3)$$

$$Y_{correct}=d \times X_{stage}+e \times Y_{stage}+f \quad (4)$$

Then, inspection setting (S03) is provided. For example, an inspection region, a preliminary inspection region, inspection conditions, and the like depending on the inspection target SA are set in response to external commands. Here, the "specified pattern" is designated to detect the coordinates thereof. Moreover, the identifying conditions are set on a pattern defect and the like, which is to be detected as "a defect".

Before the entire inspection region IA is scanned, the preliminary inspection is performed to calculate coordinate correction coefficients. FIG. 6B is a schematic plan view illustrating the top surface of the inspection target SA including alignment regions ALA for performing the preliminary inspection. The alignment region ALA includes alignment patterns 7. The alignment patterns 7 are, for example, dot patterns disposed on equally spaced grids and each positioned at the known coordinates. Here, the "known coordinates" denotes such as design coordinates that are already known. The patterns disposed in the alignment region ALA used for the preliminary inspection are not limited to the dot patterns, but may be hole patterns or any patterns which are intentionally disposed so as to be detected by the inspection.

The alignment patterns 7 are preferably located in the entire imaging area of the detection unit 50, Further, the plurality of alignment regions ALA are provided so as to be separated from each other. In FIG. 6B, for example, the alignment regions ALA are provided at the four corners of the rectangular inspection region IA. Thus, it is possible to improve precision of adjusting magnification, rotation, orthogonality, offset, and the like.

To perform the preliminary inspection in which coordinate precision is corrected using the pattern disposed such a manner, the inspection stage 10 is moved so that the imaging area of the detection unit 50 is located on the preliminary inspection region (S04).

The preliminary inspection is performed according to the above-described method (S05). In the preliminary inspection, for example, the preliminary inspection region including the known dot patterns is scanned, and the number of pixels (Xpixel_ID, Ypixel_ID) from the reference coordinates (Astart_n, Bstart_n) to each dot pattern is obtained (S06). Here, the reference coordinates (Astart_n, Bstart_n) are obtained by the corrections of the stage coordinates of the reference pixel using Equations (3) and (4).

Then, correction coefficients "g" to "k" and "m" to "r" of Equations (5) and (6) are obtained using the reference coordinates (Astart_n, Bstart_n) and the number of pixels (Xpixel_id, Ypixel_id) corresponding to each dot pattern in the preliminary inspection region (S07).

$$X_{known\_id}=g \times A_{start\_n}+h \times B_{start\_n}+i \times X_{pixel\_id}+j \times Y_{pixel\_id}+k \quad (5)$$

$$Y_{known\_id}=m \times A_{start\_n}+n \times B_{start\_n}+p \times X_{pixel\_id}+q \times Y_{pixel\_id}+r \quad (6)$$

Here, Xknown_id and Yknown_id are X and Y coordinates of the specified pattern, respectively. The correction coefficients "g" to "k" and "m" to "r" are calculated by the calculation unit 70 which performs regression analysis, for example, using Equations (5) and (6). The reference coordinates (Astart_n, Bstart_n) and the number of pixels (Xpixel_id, Ypixel_id) corresponding to the specified patterns are substituted in Equations (5) and (6).

Thereafter, the entire inspection region IA is scanned (S08). Meanwhile, a specific pattern, a defect, or the like is detected by the image processing unit 63, and the stage coordinates of the reference pixel and the number of pixels (Xpixel_id, Ypixel_id) in the corresponding scanning operation are output to the calculation unit 70. The calculation unit 70 calculates the reference coordinates (Astart_n, Bstart_n) in the corresponding scanning operation and stores the reference coordinates (Astart_n, Bstart_n) in the database 71 along with the number of pixels (Xpixel_id, Ypixel_id).

When outputting the coordinates of the specific pattern or the defect, the coordinate output device 100 reads the corresponding reference coordinates (Astart_n, Bstart_n) and the number of pixels (Xpixel_id, Ypixel_id) out from the database 71, and outputs coordinates (Xoutput_cor, Youtput_cor) calculated using Equations (7) and (8) (S09).

$$X_{output\_cor}=g \times A_{start\_n}+h \times B_{start\_n}+i \times X_{pixel\_id}+j \times Y_{pixel\_id}+k \quad (7)$$

$$Y_{output\_cor} = m \times A_{start\_n} + n \times B_{start\_n} + p \times X_{pixel\_id} + q \times Y_{pixel\_id} + r \quad (8)$$

Then, the inspection target SA is unloaded from the inspection stage 10, and the inspection is completed (S10).

Figure 7A:
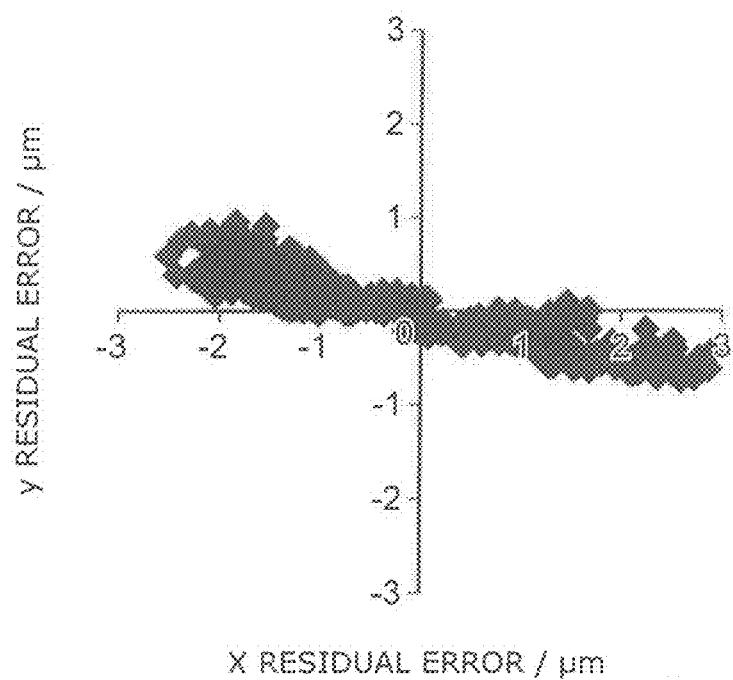
FIGS. 7A and 7B are graphs illustrating precision of the inspection method according to the embodiment.
Figure 7B:
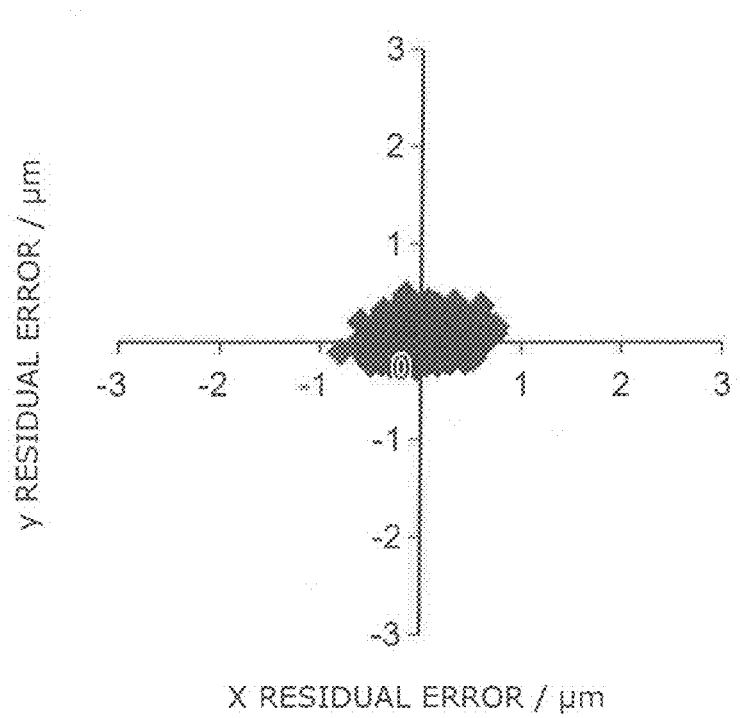

FIGS. 7A and 7B are graphs illustrating precision of the inspection method according to the embodiment. FIG. 7A is a graph illustrating a residual error distribution in a coordinate output device 200 (not illustrated) according to a comparative example. FIG. 7B is a graph illustrating a residual error distribution in the coordinate output device 100. Here, a "residual error" is a difference between the output coordinates and the absolute coordinates on the inspection target SA.

The residual errors in the coordinate output device 200 illustrated in FIG. 7A are a difference between the absolute coordinates and output coordinates (Xoutput, Youtput) calculated using Equations (9) and (10) below.

$$X_{output} = A_{start\_n} + \text{pixel size\_x} \times X_{pixel\_id} \quad (9)$$

$$Y_{output} = B_{start\_n} + \text{pixel size\_y} \times Y_{pixel\_id} \quad (10)$$

Here, pixel size_x and pixel size_y are ones in the detection unit 50. In this manner, the coordinate output device 200 performs a linear process of adding a shift amount, which is obtained by multiplying the number of pixels (Xpixel_id, Ypixel_id) by the pixel size, to the reference coordinates (Astart_n, Bstart_n).

In contrast, the X coordinate (Xoutput_cor) output from the coordinate output device 100 Includes the Y component (Bstart_n) of the reference coordinates and the Y component (Ypixel-id) of the number of pixels. The Y coordinate (Youtput_cor) includes the X component (Astart_n) of the reference coordinates and the X component (Xpixel_id) of the number of pixels. Thus, the corrections including magnification, rotation, and orthogonality components of an image obtained by the detection unit 50 is performed. For example, bending in the scanning operation is corrected. As a result, as illustrated in FIG. 7B, the residual error is significantly reduced compared to the coordinate output device 200.

The embodiment is not limited to the example described above. For example, an aspect may be realized in which the X coordinate (Xoutput_cor) includes the Y component (Ypixel_id) of the number of pixels without including the Y component (Bstart_n) of the reference coordinates, and the Y coordinate (Youtput_cor) does not include the X component (Astart_n) of the reference coordinates, and coordinates are output, which are based on a correction equation including the X component (Xpixel_id) of the number of pixels.

Figure 8:
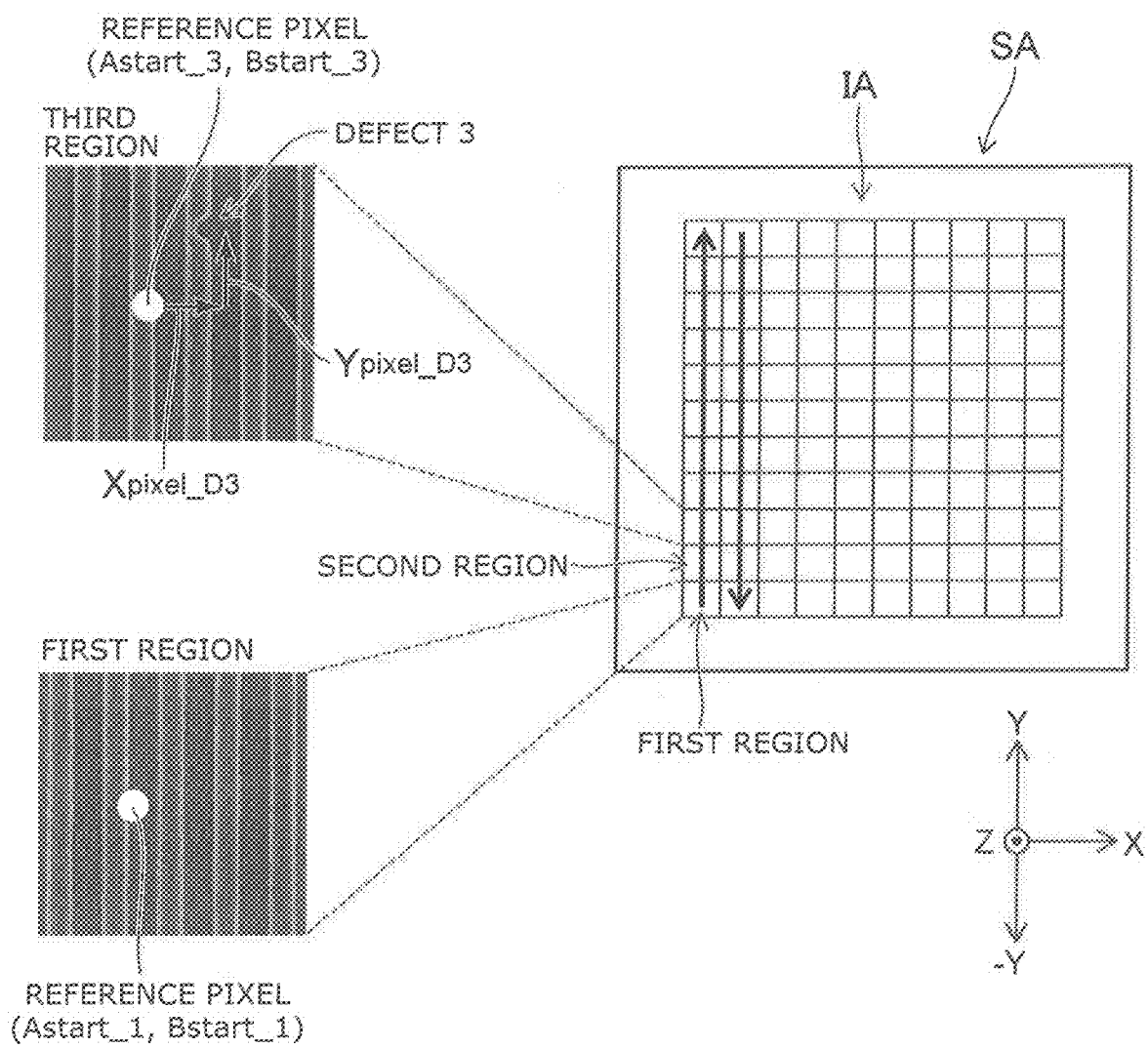
FIG. 8 is a schematic plan view illustrating an inspection method according to a variation of the embodiment.

FIG. 8 is a schematic plan view illustrating an inspection method according to a variation of the embodiment. The inspection stage 10 moves so that the Imaging area of the detection unit 50 performs a stepwise scanning in the Y-direction and the −Y-direction, and images the entire inspection region IA. In this case, an image is obtained at a position where the imaging area locates in each step of the scanning. That is, the image obtained is not a continuous image over a plurality of regions.

As illustrated in FIG. 8, for example, the scanning is started from a first region positioned at a corner of the inspection region IA, and the images are sequentially obtained while the imaging area moves in the Y-direction. The reference pixel is set in the image corresponding to each step, and the reference coordinates (Astart_n, Bstart_n) are stored. For example, in a case in which a defect 3 is detected in a third region, the number of pixels (Xpixel_D3, Ypixel_D3) which is a coordinate shift amount in the X and Y-directions from the reference coordinates (Astart_3, Bstart_3) to the defect 3 are stored as the position thereof.

A timing of the imaging in each step is output from the controller 22 to the detection unit 50, for example, reflecting a time period for stabilizing light strength of the light source 30. Alternatively, the image obtained at this timing may be processed as the effective image.

In this example, a plurality of regions including the specified patterns are designated as the preliminary inspection regions, and the reference coordinates (Astart_n, Bstart_n) and the number of pixels (Xpixel_id, Ypixel_id) corresponding to the specified patterns are obtained through the preliminary inspection. Then, the correction coefficients "g" to "k" and "m" to "r" are calculated based on the reference coordinates (Astart_n, Bstart_n) and the number of pixels (Xpixel_id, Ypixel_id), and Correction Equations (9) and (10) are achieved. In this example, since the coordinates are detected and output from the image of each step, the processing time is elongated compared with the inspection method illustrated in FIG. 2, whereas the coordinate precision is improved owing to the small size of images.

Next, a coordinate detection method according to the variation of the embodiment will be described. In this example, Equations (11) and (12) are used instead of Equations (5) and (6), and correction coefficients "i" to "k", "m", "n", and "p" to "z" are calculated. For example, the reference coordinates (Astart_n, Bstart_n) and the number of pixels (Xpixel_id, Ypixel_id) of the specified patterns are detected through the preliminary inspection, and regression analysis using Equations (11) and (12) is performed.

$$X_{known\_id} = i \times A_{start\_n} + j \times B_{start\_n} + k \times X_{pixel\_id} + m \times X_{pixel\_id}^2 + n \times Y_{pixel\_id} + p \times Y_{pixel\_id}^2 + q \times X_{pixel\_id} \times Y_{pixel\_id} + r \quad (11)$$

$$Y_{known\_id} = s \times A_{start\_n} + t \times B_{start\_n} + u \times X_{pixel\_id} + v \times X_{pixel\_id}^2 + w \times Y_{pixel\_id} + x \times Y_{pixel\_id}^2 + y \times X_{pixel\_id} \times Y_{pixel\_id} + z \quad (12)$$

In this example, it is possible to correct a residual error component due to aberration of the optical system, for example, by adding a squared component of Xpixel_n and Ypixel_n. Further, a higher order component such as a cubed component or a quadrupled component of Xpixel_n and Ypixel_n may be added. Alternatively, one aspect may include the case where a higher order component such as a squared component or more is added to one of Equations (11) and (12).

The correction coefficients "l" to x"k", "m", "n", and "p" to "z" may be calculated using Equations (13) and (14). Equations (13) and (14) include a squared component of Astart_n and Bstart_n. Thereby, it becomes possible to correct a high-order residual error component of the stage coordinates in the inspection stage 10, such as a nonlinear error of a laser interferometer.

$$X_{known\_id} = i \times A_{start\_n} + j \times A_{start\_n}^2 + k \times B_{start\_n} + m \times B_{start\_n}^2 + n \times A_{start\_n} \times B_{start\_n} + p \times X_{pixel\_id} + q \times Y_{pixel\_id} + r \quad (13)$$

$$Y_{known\_id} = s \times A_{start\_n} + t \times A_{start\_n}^2 + u \times B_{start\_n} + v \times B_{start\_n}^2 + w \times A_{start\_n} \times B_{start\_n} + p \times X_{pixel\_id} + n \times Y_{pixel\_id} + z \quad (14)$$

Further; a residual error component due to aberration of the optical system and motion of the inspection stage may be corrected, for example, by adding both a high order component of Xpixel_n and Ypixel_n and a high order component of Astart_n and Bstart_n.

Next, a coordinate detection method according to another variation of the embodiment will be described. For example, coordination correction may be performed, in which the reference coordinates (Astart_n and Bstart_n) are replaced with X_output and Y_output calculated using Equations (9) and (10).

For example, Equations (9) and (10) may be transformed into Equations (15) and (16) below.

$$A_{start\_n} = X_{output} - \text{pixel size}\_x \times X_{pixel\_id} \quad (15)$$

$$B_{start\_n} = Y_{output} - \text{pixel size}\_y \times Y_{pixel\_id} \quad (16)$$

Further, Equations (15) and (16) are substituted to Equations (5) and (6), and simplified to be Equations (17) and (18).

$$X_{known\_id} = P \times X_{output} + Q \times Y_{output} + R \times X_{pixel\_id} + S \times Y_{pixel\_id} + T \quad (17)$$

$$Y_{known\_id} = U \times X_{output} + V \times Y_{output} + W \times X_{pixel\_id} + X \times Y_{pixel\_id} + Y \quad (18)$$

For example, the coordinates (X_output, Y_output) and the number of pixels (Xpixel_n and Ypixel_n) of the specified patterns obtained through the preliminary inspection are substituted to Equations (17) and (18), and regression analysis is performed. Thereby, correction coefficients to "P" "Y" are calculated, and Correction Equations (19) and (20) are obtained.

$$X_{output\_cor} = P \times X_{output} + Q \times Y_{output} + R \times X_{pixel\_id} + S \times Y_{pixel\_id} + T \quad (19)$$

$$Y_{output\_cor} = U \times X_{output} + V \times Y_{output} + W \times X_{pixel\_id} + X \times Y_{pixel\_id} + Y \quad (20)$$

In this example, the coordinates (X_output and Y_output) are used according to Equations (9) and (10) instead of the reference coordinates (Astart_n and Bstart_n). This method is useful, for example, in a case where the coordinates (X-output, Y-output) of the pixels are stored in the database 71.

In this example, Correction Equations (19) and (20) are derived based on Equations (5) and (6), but the embodiment is not limited thereto. For example, there may be a case where correction equations are derived based on Equations (11) to (14), and the aberration of the optical system and the stage coordinates errors are corrected.

In the embodiment described above, the description has been made on the premise of the steady state mode of scanning, but there may be a case where the motion of the inspection stage 10 and the optical system 40 vary chronologically. Thus, correction equations including a time component may be used, in which start time of the inspection is designated as the origin. In a case where the plurality of light sources 30 are provided, correction equations may be used, which includes irradiated positions in the inspection target SA by lights or electron rays emitted therefrom. Further, correction equations may be individually applied to the lights or the electron rays. Although there may be various cases, Equations (7) and (8) including the calculated correction coefficients, for example, are derived depending on each case.

In the above-described embodiment, the signal output from the detection unit 50 is converted into the image, and the coordinates of the specific pattern or the defect in the inspection target are output based on the shift amount (the number of pixels) from the reference pixels in the image. Alternatively, the signal output from the detection unit 50 may be directly processed without converting into the image. For example, a device directly detecting a specific pattern or a defect from an electric signal outputs the coordinates obtained by multiplying a time period for detecting the specific pattern or the defect by a movement amount per second under setting an inspection start time as the origin. Thus, for example, the number of pixels (Xpixel_id, Ypixel_id) in Equations (5) to (20) above may be replaced by a time period expressed as (Xtime_id, Ytime_id) in which a specific pattern or a defect is detected. Moreover, pixel size_x and pixel size_y in Equations (9) and (10) may be replaced by a movement amount per second expressed as size_time_x and size_time_y.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A method for detecting coordinates of an object in an inspection target, the method comprising:
   controlling an inspection stage to move to a first location, and detecting a first position of a reference pixel in the inspection target placed on a placement surface of the inspection stage;
   controlling the inspection stage to move to a second location, and detecting a second position of the object in the inspection target spaced from the first position of the reference pixel;
   detecting a coordinate shift from the first position to the second position, wherein the coordinate shift includes a first shift component in a first direction taken along the placement surface, and a second shift component in a second direction taken along the placement surface and crossing the first direction; and
   calculating coordinates of the second position of the object based on a relationship between coordinates in the placement surface and coordinates in the inspection target, wherein a coordinate of the second position of the object in the first direction depends on the first position, the first shift component and the second shift component, and a coordinate of the second position of the object in the second direction depends on the first position, the first shift component and the second shift component, wherein
   the coordinates of the second position are expressed by first and second polynomials,
   the first polynomial including a first coefficient multiplied by the first shift component and a second coefficient multiplied by the second shift component,
   the second polynomial including a third coefficient multiplied by the first shift component and a fourth coefficient multiplied by the second shift component,
   the first coefficient, the second coefficient, the third coefficient, and the fourth coefficient are determined based on a plurality of coordinates known in the inspection target,
   the first polynomial includes the coordinates of the first position as a variable,
   the second polynomial includes the coordinates of the first position as a variable, and
the method further comprises:
   detecting stage coordinates in the inspection stage corresponding to the first position;

calculating the coordinate in the first direction of the first position using a third polynomial, the third polynomial including a coordinate in the first direction of the stage coordinates and a coordinate in the second direction of the stage coordinates as variables; and calculating the coordinate in the second direction of the first position using a fourth polynomial, the fourth polynomial including the coordinate in the first direction of the stage coordinates and the coordinate in the second direction of the stage coordinates as variables.

2. The method according to claim 1, wherein
the first polynomial includes a first coefficient multiplied by the first shift component, a second coefficient multiplied by the second shift component, a fifth coefficient multiplied by the coordinate in the first direction of the first position, and a sixth coefficient multiplied by the coordinate in the second direction of the first position,
the second polynomial includes a third coefficient multiplied by the first shift component, a fourth coefficient multiplied by the second shift component, a seventh coefficient multiplied by the coordinate in the first direction of the first position, and an eighth coefficient multiplied by the coordinate in the second direction of the first position, and
the first coefficient, the second coefficient, the third coefficient, the fourth coefficient, the fifth coefficient, the sixth coefficient, the seventh coefficient, and the eighth coefficient are determined based on a plurality of coordinates known in the inspection target.

3. The method according to claim 1, wherein
the first polynomial includes a first constant term, and the second polynomial includes a second constant term.

4. The method according to claim 1, wherein
the third polynomial includes a ninth coefficient multiplied by the coordinate in the first direction of the stage coordinates, and a tenth coefficient multiplied by the coordinate in the second direction of the stage coordinates,
the fourth polynomial including an eleventh coefficient multiplied by the coordinate in the first direction of the stage coordinates, and a twelfth coefficient multiplied by the coordinate in the second direction of the stage coordinates, and
the ninth coefficient, the tenth coefficient, the eleventh coefficient, and the twelfth coefficient are determined based on the plurality of coordinates known in the inspection target.

5. The method according to claim 1, wherein
the third polynomial includes a third constant term, and the fourth function includes a fourth constant term.

6. The method according to claim 1, wherein
the first polynomial and the second polynomial include at least one of a squared component of the first shift component and a squared component of the second shift component.

7. The method according to claim 1, further comprising:
obtaining an image of the inspection target, wherein
the first position corresponds to a position of a first pixel in the image and the second position corresponds to a second pixel in the image, and
the first shift component and the second shift component are expressed by the number of pixels in the image.

8. A coordinate output device comprising:
an inspection stage;
a controller controlling the inspection stage;
a detector detecting a position of an object in an inspection target placed on the inspection stage;
a calculator calculating coordinates in the inspection target; and
an output component outputting the coordinates, wherein
the controller controls the inspection stage to move to a first location and then to move to a second location,
the detector detects a first position of a reference pixel in the inspection target placed on a placement surface of the inspection stage when the inspection stage is located at the first location and a second position of the object in the inspection target separated from the first position of the reference pixel when the inspection stage is located at the second location, a coordinate shift from the first position to the second position including a first shift component in a first direction taken along the placement surface, and a second shift component in a second direction taken along the placement surface and crossing the first direction,
the calculator calculates coordinates of the second position of the object based on a relationship between coordinates in the placement surface and coordinates in the inspection target, wherein a coordinate of the second position of the object in the first direction is calculated using a first polynomial including the first position, the first shift component and the second shift component as variables, and a coordinate of the second position of the object in the second direction is calculated using a second polynomial including the first position, the first shift component and the second shift component as variables,
the output component outputting the coordinate in the first direction of the second position of the object and outputting the coordinate in the second direction of the second position of the object,
the calculator identifies stage coordinates corresponding to the first position based on an output of the controller,
the calculator calculates a coordinate in the first direction of the first position using a third polynomial, the third polynomial including a coordinate in the first direction of the stage coordinates and a coordinate in the second direction of the stage coordinates as variables,
the calculator calculates a coordinate in the second direction of the first position using a fourth polynomial, the fourth polynomial including the coordinate in the first direction of the stage coordinates and the coordinate in the second direction of the stage coordinates as variables, and
the output component outputting the coordinate in the first direction of the first position and the coordinate in the second direction of the first position.

9. The device according to claim 8, wherein
the detector obtains an image of the inspection target, and
the calculator calculating the coordinates in the first direction and the second direction of the second position based on pixels in the image.

10. The device according to claim 9, wherein
the first shift component and the second shift component are expressed by the number of pixels in the image.

11. A defect inspection device comprising:
an inspection stage;
a controller controlling the inspection stage;
a detector detecting a position of a defect in an inspection target placed on the inspection stage; and a calculator calculating coordinates in the inspection target, wherein the controller controls the inspection stage to move to a first location and then to move to a second location, the detector detects a reference position in the inspection target placed on a placement surface of the inspection stage when the inspection stage is located at the first location and a position of the defect in the inspection target placed on the placement surface of the inspection stage when the inspection stage is located at the second location, the defect being separated from the reference position in the inspection target, a coordinate shift from the reference position to the position of the defect including a first shift component in a first direction taken along the placement surface and a second shift component in a second direction taken along the placement surface and crossing the first direction, and the calculator calculates coordinates of the defect position based on a relationship between coordinates in the placement surface and coordinates in the inspection target, wherein a coordinate of the defect position in the first direction is calculated using a first polynomial including the reference position, the first shift component and the second shift component as variables, and a coordinate of the defect position in the second direction is calculated using a second polynomial including the reference position, the first shift component and the second shift component as variables, wherein the calculator identifies stage coordinates corresponding to the reference position based on an output of the controller, the calculator calculates a coordinate in the first direction of the reference position using a third polynomial, the third polynomial including a coordinate in the first direction of the stage coordinates and a coordinate in the second direction of the stage coordinates as variables, and the calculator calculates a coordinate in the second direction of the reference position using a fourth polynomial, the fourth polynomial including the coordinate in the first direction of the stage coordinates and the coordinate in the second direction of the stage coordinates as variables.

* * * * *